UNITED STATES PATENT OFFICE.

HARRY P. TABER, OF WILMINGTON, DELAWARE.

PROCESS FOR DECORATING FIBER.

1,036,163.   Specification of Letters Patent.   Patented Aug. 20, 1912.

No Drawing.   Application filed July 12, 1910. Serial No. 571,642.

*To all whom it may concern:*

Be it known that I, HARRY P. TABER, a citizen of the United States, residing at Wilmington, in the county of Newcastle and State of Delaware, have invented certain new and useful Improvements in Processes for Decorating Fiber, of which the following is a specification.

My invention relates to a certain new and useful process of treating vulcanized fiber, paper, fabrics, leather, wood, celluloid, rubber, etc., whereby one is enabled permanently to place upon the said materials certain designs, finishings and decorations.

Heretofore these designs have been placed upon vulcanized fiber and analogous substances by tinting, painting, varnishing or enameling their surfaces. The objection to decorating the surfaces of said materials in this manner is that the designs may be rubbed, scratched or washed away.

It is my purpose, therefore, to apply these chemical compounds to the various substances in such a manner that the materials and substances will become saturated and absorb the chemicals so that the compounds and chemicals will unite and become a part of the substances treated and thereby make it impossible to rub, scratch or wash the designs off without destroying the substances or materials themselves.

Substances like celluloid and vulcanized fiber have been colored in the mass in the process of making the same by the addition of various pigments, but to my knowledge there has never before been discovered any compound or process for placing the designs upon such substances whereby the compound unites with and becomes a part of the same so that the designs cannot be destroyed.

The object of my invention, therefore, is to enable one permanently to finish vulcanized materials, etc., with designs, letters or decorations by treating said materials by a new process, which I will now describe.

Using vulcanized fiber as a basis of description, the process which in effect describes the means of applying the color or design to any of the materials mentioned, is as follows: The sheet of fiber is first prepared by giving it a thorough cleansing with alcohol, benzin or other suitable wash in order to remove all traces of grease or dirt.

To finish the fiber with a design of any character the design is applied by any well known process of printing, embossing, lithography, or photography or it may manually be drawn upon the fiber.

The material used in applying the design is a specially prepared ink or varnish, such as asphalt, gum, oil or grease paint, or ink, best adapted to the result desired, and which will be capable of resisting water, alcohol and acid. After the design is applied to the fiber the sheet is given a bath of water slightly acidulated, preferably with acetic acid. It will be apparent that the acid water will attack the part of the fiber left uncovered by the applied design, and thus prepare the uncovered portions for the better reception of the coloring matter to be applied later. This coloring matter is prepared by any of the well known processes for the making of oil or water paints or stains which may be prepared by the mixture of suitable acid, basic or neutral salts of anilin with oil, water, alcohol or acid as best suited to the result desired; for instance, a deep violet is secured by a solution of two grains of methylviolet to four ounces of water and one gram of acetic acid, or the coloring material may be prepared with mineral or vegetable pigments instead of anilin salts in solution. This matter may be applied to the sheet either by means of a brush or sponge or by dipping the sheet on which the design has been applied in a tank containing the coloring matter. The sheet is then allowed to dry thoroughly. It is then sponged with a suitable solvent for the material used in applying the design. This solvent will remove the material leaving the under surface free from coloring matter which has been resisted by the design ink or varnish thus showing the original color of the fiber.

It will be apparent that a second design may be applied over the first in the same manner as before described, a further treatment with coloring matter, and subsequent removal of the design material, producing an effect of two or more colors. This may be carried on indefinitely, adding color and shading to whatever extent may be desired.

If it is desired to finish the sheet in one color alone or in combination of shaded colors, covering the entire sheet, this may be accomplished by applying the coloring matter as heretofore explained and further treating it as follows: After the coloring matter has been applied to the sheet and has become thoroughly dry it is subjected to a bath of a combination of ethylene tetrachlorid $CCl_2:CCl_2$ 40%, ethylene trichlorid $CCl_2:CHCl$ 40%, wax such as Japan wax 10%, alcohol 10%, or alcohol and ethylene chlorid or any of its polymers 5% each. These proportions may vary acording to the substances being treated. This material fixes the color and by chemical reactions forces the coloring matter to form a combination with the chemical construction of the fiber and other materials, thus making the colors, the chlorids, the cellulose materials of the body of the fiber etc., one homogeneous mass which will be unaffected by water, alcohols or any of the hydro-carbons or other well known solvents for colors, and becomes in effect, a thoroughly water-resisting surface, of much higher efficiency than the raw material without this treatment, and thus of far greater value as a commercial product.

The design may be applied either as a positive print or drawing, that is to say, the design may be made to appear in the exact manner that the finally finished sheet is to show in effect, or the design may be applied in reverse or negatively, thus being in effect what a photographic negative is to a finished photographic print, in which case the finished fiber will after further treatment show the design desired reproduced as a positive print or drawing upon the sheet.

The proportions of the ingredients which make up the compound vary and may be changed according to the substances being treated; thus the proportions as set forth for treating vulcanized fiber are not the same as the proportions necessary in treating leather. Further, in different colored leather, such as tan or gray, it is necessary to change the proportions of the ingredients which make up the compound. Since I have disclosed the exact proportions for treating one of the materials, vulcanized fiber, it should be very easy for one skilled in the art to ascertain the proportions necessary for the treatment of other materials.

It is to be understood that I am not restricting myself to the treatment of any particular material or to any exact proportions of ingredients which form the compounds but that I claim the composition of the ingredients set forth and the right to vary the proportions of the same according to the materials being treated and the nature of their substances.

What I claim is:

1. The herein described process of decorating, consisting in first cleansing the material to be treated, then applying a design with an impermeable substance, then passing the material through a bath of water and acetic acid to prepare it for an application of coloring matter, then applying coloring matter to the material, allowing the coloring matter to dry, then removing the impermeable substance, and then subjecting the treated material to a bath to fix the coloring matter.

2. A process for permanently decorating vulcanized fiber and like materials with designs, consisting in first cleansing the material, placing the design thereon with some impermeable ink or varnish, applying a bath of acidulated water to the fiber, which prepares the uncovered fiber for better receiving coloring matters, then applying coloring matter to the fiber, then thoroughly drying the fiber, then removing the impermeable ink or varnish, and finally subjecting the fiber to a bath which fixes the color by chemical reactions.

3. A process for permanently decorating vulcanized fiber and like materials with designs, which consists in first cleansing the material, then placing the design thereon with an impermeable ink or varnish of acid-resisting qualities, then subjecting the fiber to an acid bath which prepares the uncovered fiber for better receiving the coloring matter, then subjecting the fiber to a bath of coloring matter consisting of a mixture of suitable salts of anilin with a suitable solvent, then thoroughly drying the fiber, then removing the impermeable ink or varnish with a suitable solvent, and finally subjecting the fiber to a bath, which fixes the color by chemical reactions, consisting of a combination of ethylene tetrachlord, ethylene trichlorid, Japan wax and alcohol.

4. A process for permanently decorating vulcanized fiber and like materials with designs, which consists in first cleansing the material, then placing the design thereon with an impermeable ink or varnish, of acid-resisting qualities, then subjecting the fiber to a bath of water slightly acidulated with acetic acid which prepares the uncovered fiber for better receiving the coloring matter, then subjecting the fiber to a bath of coloring matter consisting of a mixture of suitable salts of anilin with a suitable solvent, then thoroughly drying the fiber, then removing the impermeable ink or varnish with a suitable solvent, and finally subjecting the fiber to a bath which fixes the color by chemical reactions, consisting of a combination of ethylene tetrachlorid, ethylene trichlorid, Japan wax and alcohol.

In testimony whereof, I affix my signature in presence of two witnesses.

HARRY P. TABER.

Witnesses:
H. E. MANGHUM,
MOFI H. LEOD.